US010446848B2

(12) United States Patent
Harutyunyan

(10) Patent No.: US 10,446,848 B2
(45) Date of Patent: Oct. 15, 2019

(54) METHOD FOR CONTROLLABLE SYNTHESIS OF CARBON BASED BATTERY ELECTRODE MATERIAL

(71) Applicant: HONDA MOTOR CO., LTD., Minato-ku, Tokyo (JP)

(72) Inventor: Avetik Harutyunyan, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 15/459,791

(22) Filed: Mar. 15, 2017

(65) Prior Publication Data
US 2017/0279120 A1  Sep. 28, 2017

Related U.S. Application Data

(60) Provisional application No. 62/313,554, filed on Mar. 25, 2016.

(51) Int. Cl.
| | |
|---|---|
| *H01M 4/587* | (2010.01) |
| *C01B 32/156* | (2017.01) |
| *H01M 10/0525* | (2010.01) |
| *C01B 32/152* | (2017.01) |
| *C01B 32/15* | (2017.01) |
| *H01M 4/96* | (2006.01) |
| *H01M 4/1393* | (2010.01) |
| *H01M 4/36* | (2006.01) |
| *H01M 4/66* | (2006.01) |
| *H01M 4/583* | (2010.01) |

(52) U.S. Cl.
CPC ............. *H01M 4/587* (2013.01); *C01B 32/15* (2017.08); *C01B 32/152* (2017.08); *H01M 4/1393* (2013.01); *H01M 4/364* (2013.01); *H01M 4/96* (2013.01); *H01M 10/0525* (2013.01); *H01M 4/583* (2013.01); *H01M 4/663* (2013.01); *H01M 2220/30* (2013.01)

(58) Field of Classification Search
CPC .. H01M 4/587; H01M 10/0525; H01M 4/364; H01M 2220/30
See application file for complete search history.

(56) References Cited

U.S. PATENT DOCUMENTS

| | | | |
|---|---|---|---|
| 6,146,791 A | 11/2000 | Loutfy et al. | |
| 7,531,273 B2 | 5/2009 | Wagner et al. | |
| 7,879,260 B2 | 2/2011 | Naruto et al. | |
| 2005/0158626 A1* | 7/2005 | Wagner | B82Y 30/00 |
| | | | 429/231.8 |
| 2011/0206988 A1* | 8/2011 | Tanaka | H01M 4/505 |
| | | | 429/220 |
| 2011/0278506 A1 | 11/2011 | Toyokawa | |
| 2011/0284805 A1 | 11/2011 | Samulski et al. | |

FOREIGN PATENT DOCUMENTS

| | | |
|---|---|---|
| EP | 2769960 A1 | 8/2014 |
| WO | WO 2010/126767 A2 | 11/2010 |

* cited by examiner

*Primary Examiner* — Lisa S Park
(74) *Attorney, Agent, or Firm* — Arent Fox LLP

(57) ABSTRACT

Carbon-based electrode materials including graphite particles bridged by hemispheres of fullerene, as well as methods of synthesizing the carbon-based electrode materials, are disclosed. These carbon-based electrode materials may allow for decreased irreversible capacity loss during cycling in lithium-ion battery systems.

19 Claims, 7 Drawing Sheets

| | | |
|---|---|---|
| Single Point Surface Area at P/Po 0.19945424: | 4.0837 | m²/g |
| BET Surface Area: | 3.9844 | m²/g |
| Langmuir Surface Area: | 5.3314 | m²/g |
| BJH Adsorption Cumulative Surface Area of pores between 1.700000 and 300.000000 nm Diameter: | 1.4061 | m²/g |
| BJH Desorption Cumulative Surface Area of pores between 1.700000 and 300.000000 nm Diameter: | 1.5238 | m²/g |
| Volume | | |
| Single Point Adsorption Total Pore Volume of pores less than 73.2978 nm Diameter at P/Po 0.97286891: | 0.006734 | cm³/g |
| BJH Adsorption Cumulative Pore Volume of pores between 1.700000 and 300.000000 nm Diameter: | 0.009824 | cm³/g |
| BJH Desorption Cumulative Pore Volume of pores between 1.700000 and 300.000000 nm Diameter: | 0.009739 | cm³/g |
| Pore Size | | |
| Adsorption Average Pore Diameter (4V/A by BET): | 6.7602 | nm |
| BJH Adsorption Average Pore Diameter (4V/A): | 27.9462 | nm |
| BJH Desorption Average Pore Diameter (4V/A): | 25.5640 | nm |

Fig. 4

METHOD FOR CONTROLLABLE SYNTHESIS OF CARBON BASED BATTERY ELECTRODE MATERIAL

CROSS-REFERENCE TO RELATED APPLICATIONS

This application claims the benefit of U.S. Provisional Patent Application No. 62/313,554, entitled "Method For Controllable Synthesis Of Carbon Based Battery Electrode Material," filed on Mar. 25, 2016, which is expressly incorporated by reference herein in its entirety.

BACKGROUND OF THE DISCLOSURE

Lithium-ion secondary cells or batteries are commonly used as power sources in portable electronic devices. Such rechargeable cells generally use a lithium transition metal oxide (e.g., lithium colbaltate) positive electrode and a negative electrode composed of a highly porous carbonaceous material, typically graphite. The carbonaceous material, however, may also include other carbons, metal and/or a pyrolyzed organic material. A lithium-ion soluble electrolyte is provided between the two electrodes, and the cell is charged. During the electrochemical process of charging, some of the lithium ions in the positive electrode migrate from the positive electrode (serving as the anode) and intercalate into the negative electrode (serving as the cathode). The ability of an electrode to accept ions for intercalation depends largely, for example, on the crystallinity, the microstructure, the porosity, and/or the micromorphology of the material comprised by the electrode. During discharge, the negative charge held by the negative electrode (now serving as the anode) is conducted out of the battery through its negative terminal and the lithium ions migrate through the electrolyte and back to the positive electrode (now serving as the cathode). While it is understood that the terms "anode" and "cathode" apply to each of the negative and positive electrodes depending upon whether the cell is being charged or is discharging, hereinafter the term "anode" is used to refer to the negative electrode, and the term "cathode" is used to refer to the positive electrode.

During the first electrochemical intercalation of lithium ions into the carbonaceous anode material, some lithium is irreversibly consumed and a significant amount of capacity cannot be recovered in the following discharge. This irreversible capacity loss, which mainly depends on the type of carbonaceous anode material and electrolyte solution used, is explained on the basis of the reduction of the electrolyte solution and the formation of a passivating film at the $Li_xC$ interface. Chemical combination of lithium to the active surface functional groups of carbon may also play an important role in this irreversible capacity loss. Another source of irreversible capacity is the reduction of Li ion concentration due to the ions' strong binding with anode material followed by the growth of dendritic forms of Li. This irreversible capacity loss affects the cell balancing and lowers the energy density of lithium-ion batteries.

At present, special-types of "hard carbon" or graphite are used as anode materials in commercial lithium-ion batteries. The carbon/graphite materials deliver a reversible specific capacity of only ~370 mAh/g, corresponding to the chemical formula of $LiC_6$, as compared to 3830 mAh/g for metallic lithium. The main advantage of these special carbon materials is their relatively low irreversible capacity loss (≤10%) combined with their high storage capacity (>400 mAh/g). However, the methods of synthesizing these special carbon materials do not allow independent fine tuning or control of pore size distribution, crystallinity and surface area of the materials, which could further improve capacity and reduce irreversible capacity loss.

Based on the foregoing, there is a need in the art to synthesize inexpensive carbon-based electrode materials that have increased reversible capacity and decreased irreversible capacity loss for use in lithium-ion battery systems. It would be further advantageous if the materials could be synthesized using methods that could control pore size distribution, surface area, and crystallinity of the electrode material.

BRIEF DESCRIPTION OF THE DISCLOSURE

Aspects of the present disclosure are directed generally to composite materials for use in, for example, lithium-ion batteries. The composite materials include graphite particles bridged by at least one pentagon ring. These composite materials may be used in electrodes to allow for decreased irreversible capacity loss during cycling similar to expensive "hard carbon" materials, and may be synthesized to control pore size distribution, surface area, and crystallinity of the carbon composite materials.

In one aspect, the present disclosure is directed to a composite carbon material comprising at least a first graphite particle connected to at least a second graphite particle, wherein the first and second graphite particles are connected by a pentagon carbon ring precursor.

In another aspect, the present disclosure is directed to a carbon-based electrode material comprising at least a first graphite particle connected to at least a second graphite particle, wherein the first and second graphite particles are connected by a hemisphere of fullerene.

In another aspect, the present disclosure is directed to a method of synthesizing a carbon-based electrode material. The method comprises: mixing at least a first graphite particle and a second graphite particle with at least one hemisphere of fullerene; and heating the mixture to a temperature of up to 2000° C. under presence of a hydrocarbon gas.

In another aspect, the present disclosure is directed to a method of making a composite material. The method includes providing a mixture of at least a first graphite particle and a second graphite particle with at least one pentagon ring precursor; and treating the mixture to bridge the first graphite particle and the second graphite particle with at least one pentagon ring.

BRIEF DESCRIPTION OF THE DRAWINGS

FIG. 4 shows example results of BET surface area measurements corresponding to an example hard carbon material according to the present disclosure and as shown in FIGS. 2A-2C.

DETAILED DESCRIPTION OF THE DISCLOSURE

Generally, the present disclosure is directed to composite materials for use in, for example, lithium-ion batteries and to methods for synthesizing the composite materials. The materials are synthesized to include graphite particles bridged by one or more pentagon carbon rings (such as by hemispheres of fullerene). Electrodes made from these materials may allow for decreased irreversible capacity loss during cycling. As used herein, the term "electrode" generally refers to an electrical conductor. For example, in one illustrative example, an "electrode" may refer to an anode. Further, the methods of synthesizing these materials may allow for controlled pore size distribution, surface area, and crystallinity of the materials.

Figure 1:
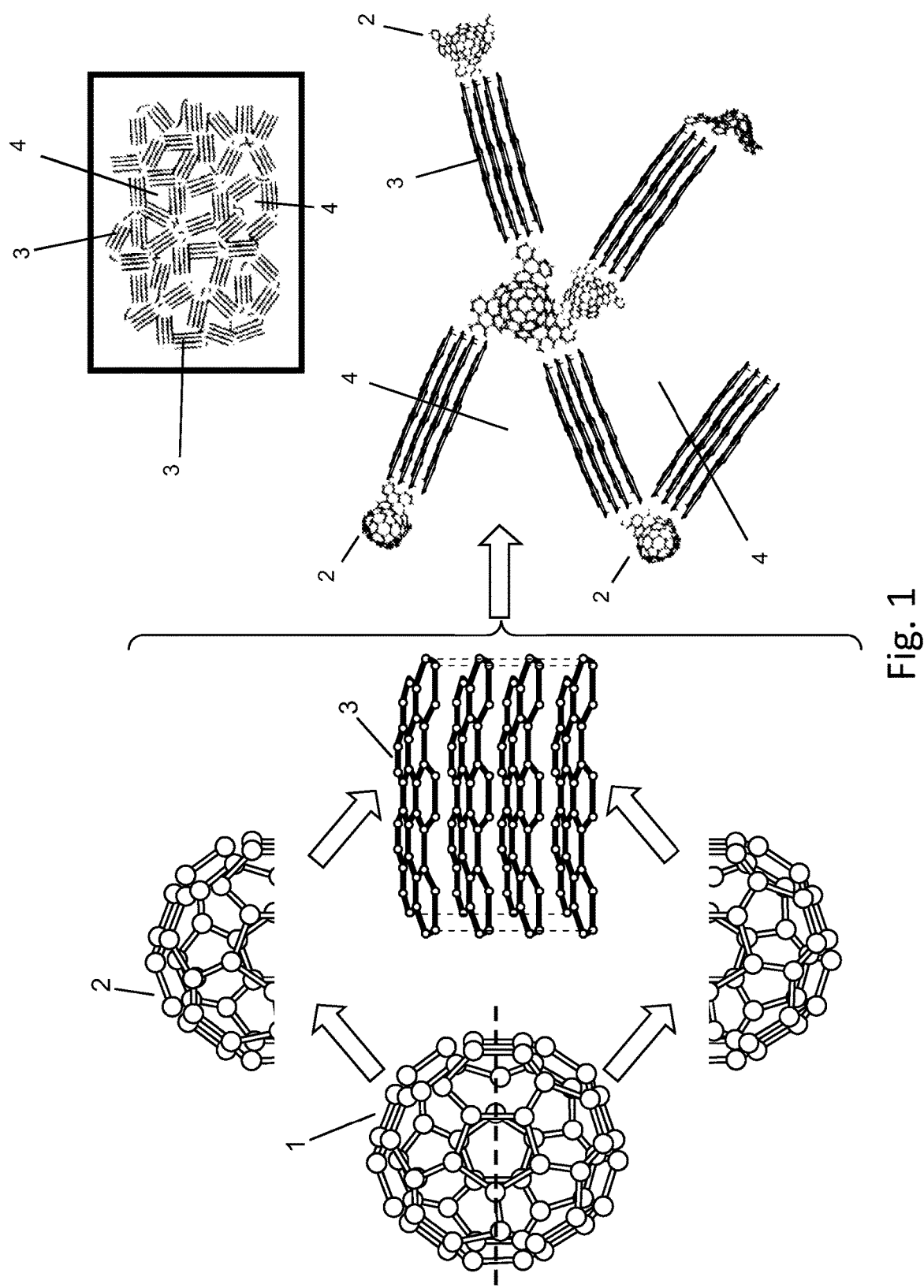
FIG. 1 is a schematic depicting a method for controllably synthesizing the carbon-based electrode material of one aspect of the present disclosure.
Figure 2A:
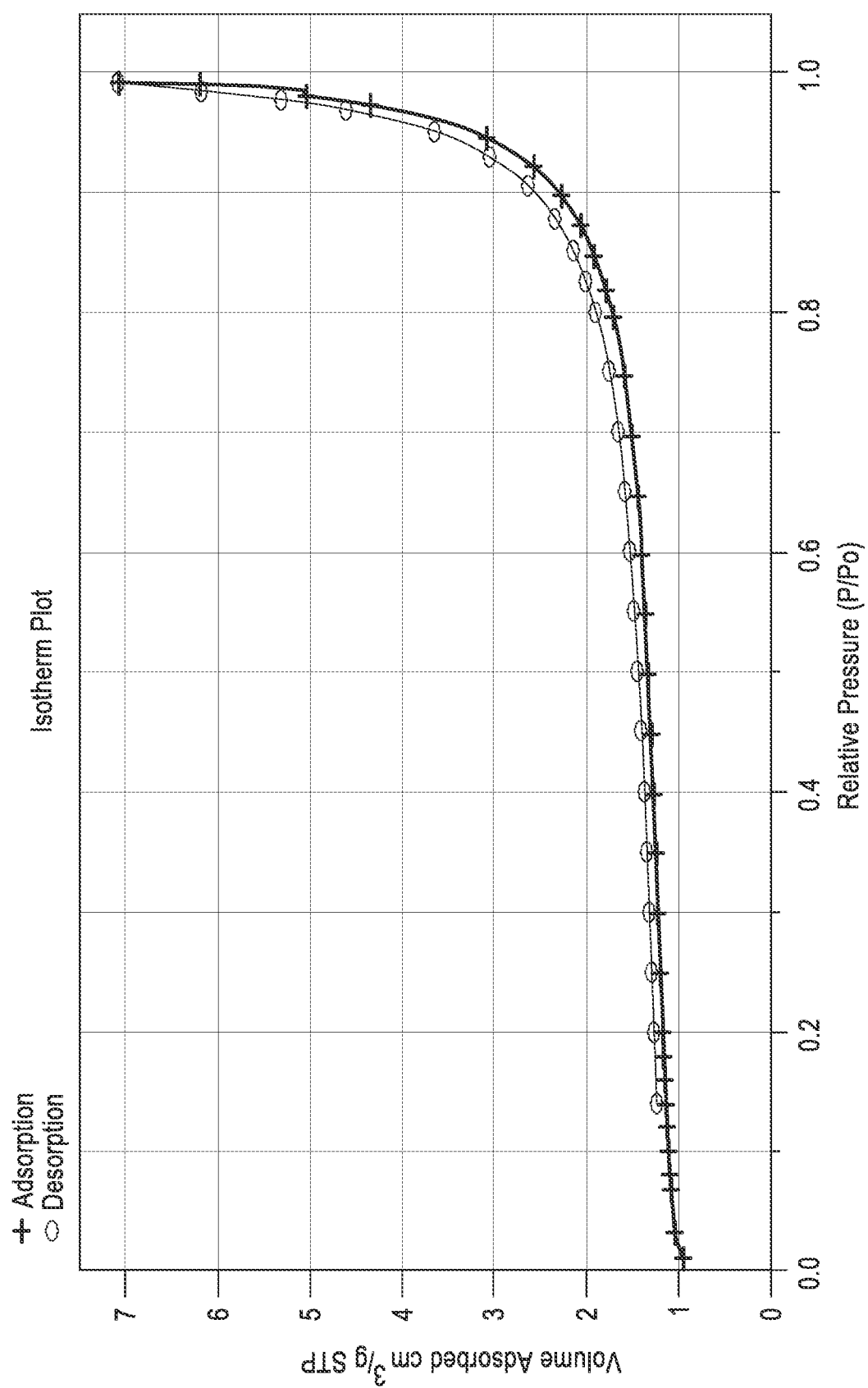
FIG. 2A shows an example result of Brunauer-Emmett-Teller (BET) surface area measurements corresponding to an example hard carbon material according to the present disclosure.
Figure 2B:
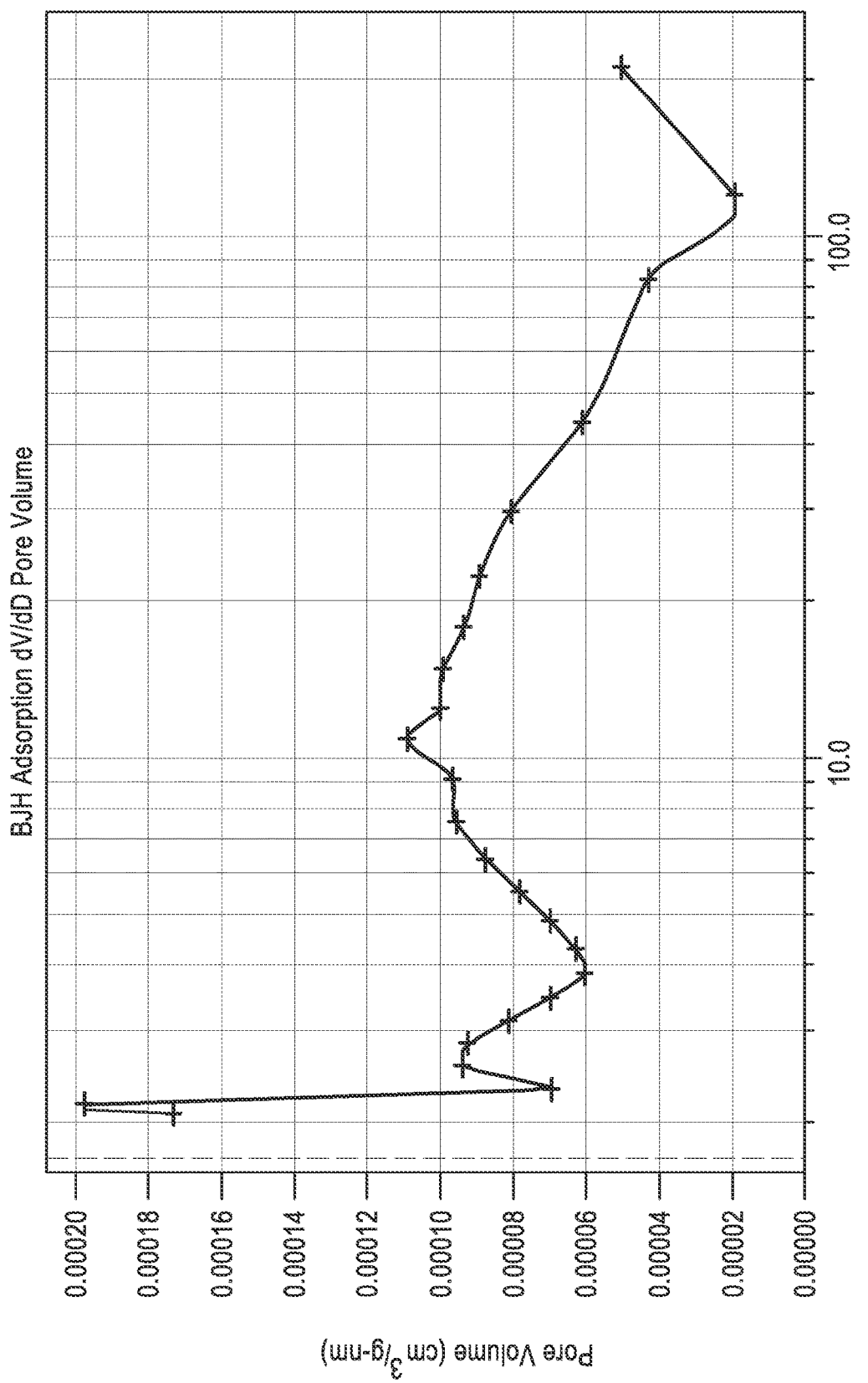
FIG. 2B shows an example result of Brunauer-Emmett-Teller (BET) surface area measurements corresponding to an example hard carbon material according to the present disclosure.
Figure 2C:
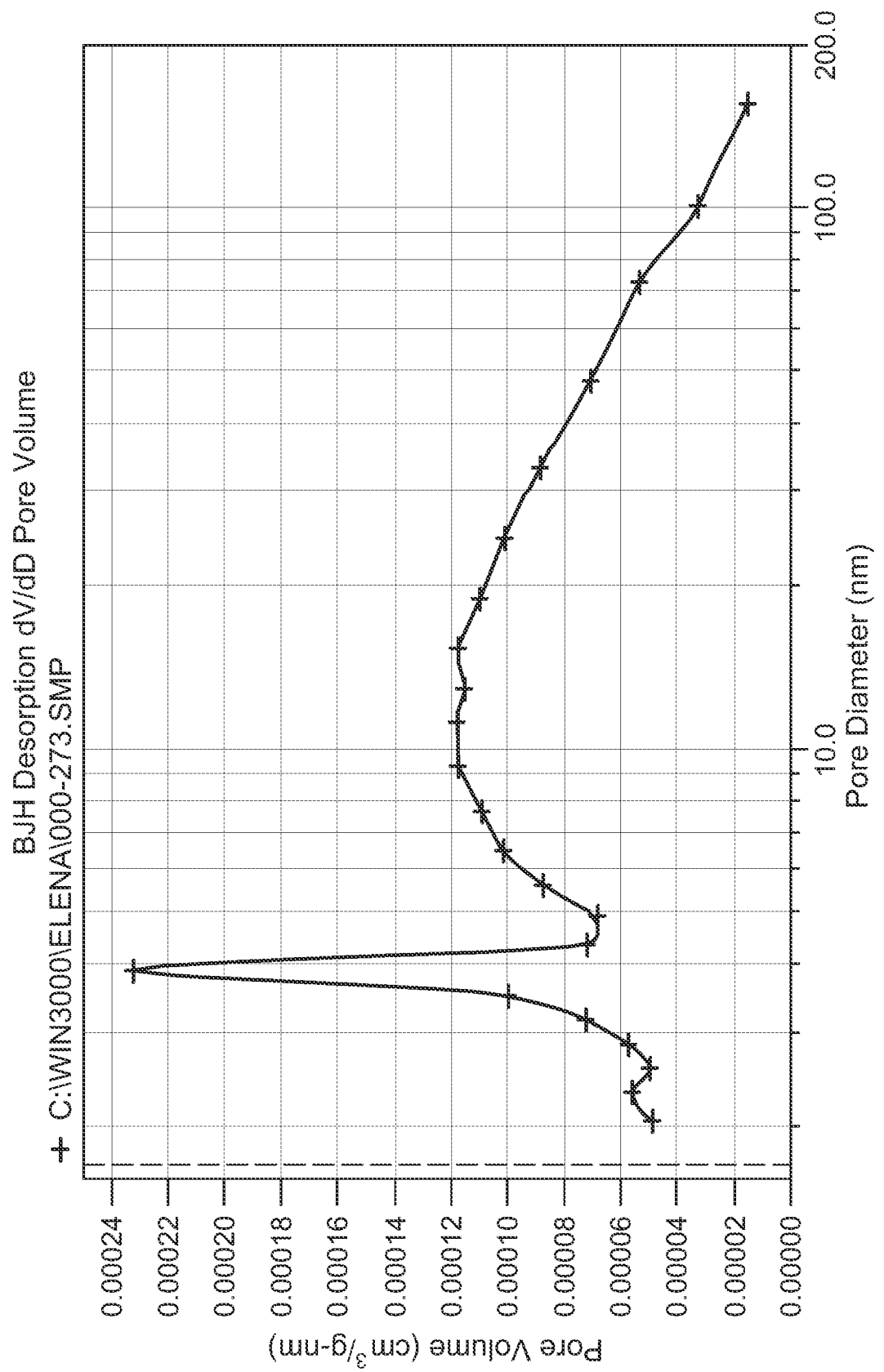
FIG. 2C shows an example result of Brunauer-Emmett-Teller (BET) surface area measurements corresponding to an example hard carbon material according to the present disclosure.

The composite materials of the present disclosure include graphite particles bridged by a pentagon carbon ring (e.g., hemispheres of fullerene). As used herein, "bridge," "bridged," or "bridging" refers to connecting at least one graphite particle to at least a second graphite particle by a pentagon ring (or material containing a pentagon ring). In a non-limiting example, the pentagon ring may be carbon based, such as part of a hemisphere of fullerene. Typically, more than two graphite particles are connected using one or more pentagon rings, thereby creating a mesh network-type carbon-based electrode material as shown in FIG. 1.

Generally, graphite is a suitable carbonaceous material for use in forming an electrode (e.g., an anode) in a lithium-ion battery because of its ability to provide an initial high reversible capacity for the battery. As used herein, "graphite" refers to carbonaceous materials with a layered structure, typically comprising layers of graphene. Examples of graphite material for use in the carbon-based electrode materials of the present disclosure include, but are not limited to, graphite powder, such as artificial graphite and natural graphite, and a purified product thereof, a graphitized product of electroconductive carbon black, such as acetylene black and Ketjen black, and carbon fibers, such as vapor phase growth carbon fibers.

Typically, the graphite is in particle or powder form, having an average particle diameter of about 1 µm or more, and optionally, about 5 µm or more, and optionally, from about 1 µm to about 45 µm, and optionally, from about 2.5 µm to about 35 µm, and optionally from about 5 µm to about 25 µm. Without being limited to any particular theory, it appears that where the average particle diameter is too small, the specific surface area of the graphite is increased, whereby the irreversible capacity is increased to lower the battery capacity. In the case where the average particle diameter is too large, conversely, it appears that the thickness of the electrode material is restricted, whereby it is difficult to form a uniform electrode material.

The specific surface area of the graphite is generally about 0.1 $m^2/g$ or more, suitably, optionally about 0.3 $m^2/g$ or more, and optionally, about 0.5 $m^2/g$ or more. In particular aspects, the surface area of the graphite ranges from about 0.1 $m^2/g$ to about 30 $m^2/g$, including from about 0.3 $m^2/g$ to about 20 $m^2/g$, and including from about 0.5 $m^2/g$ to about 10 $m^2/g$. In the case where the specific surface area is too small, it appears that the rate characteristics of the battery are deteriorated. In the case where the specific surface area is too large, it appears that the initial efficiency of the battery is too low. The measurement of the specific surface area may be attained by the BET method.

The carbon-based electrode material typically includes graphite. In addition to graphite, the carbon-based electrode material of the present disclosure may include one or more pentagon carbon rings made from one or more pentagon carbon ring precursors. As used herein, "pentagon carbon ring precursor" interchangeably refers to molecules that include or are capable of forming one or more C5 pentagon rings. The pentagon structures of these precursors may improve the graphite particles connection and rigidity.

In one aspect, the pentagon carbon ring precursor is fullerene or a fracture thereof. As used herein, "fullerene" refers to any product materials that are formed utilizing a fullerene generating process, and is generally carbon material in a spherical shell form. Example fullerene generating processes include, without limitation, high-intensity laser desorption, arc discharge (e.g., a Kratschmer-Huffman process), and combustion flame generation.

Example fullerene for use in the carbon-based electrode materials described herein include, for example, $C_{60}$, $C_{70}$, $C_{74}$, $C_{78}$, $C_{80}$, $C_{82}$, $C_{84}$, $C_{86}$, $C_{88}$, $C_{90}$, $C_{92}$, $C_{94}$, $C_{98}$, $C_{100-250}$, and $C_{250+}$ (e.g., $C_{270}$), as well as dimers and trimers of these compounds, and as well as fractions thereof (e.g., fractions of $C_{60}$, $C_{70}$). Combinations of these fullerene compounds may also be used without departing from the present disclosure. For example, $C_{60}$, $C_{70}$ and a dimer and a trimer of these compounds are suitable, since they can be easily obtained industrially and have a high affinity to the surface of graphite.

As shown in FIG. 1, it is suitable for the fullerene compound (1) to be split in half to form a hemisphere (2) of fullerene.

When used in lithium-ion batteries, the carbon-based electrode material can further include binder (e.g., polymeric binders such as polyvinylidene fluoride, hexafluoropropylene, polyethylene, polyethylene oxide, polypropylene, polytetrafluoroethylene, polyacrylates, etc.), and other additives, such as an electroconductive agent, and others as known in the lithium-ion battery art. The species and contents of the materials may be appropriately adjusted depending on the battery performance demanded.

The present disclosure is further directed to methods of synthesizing the carbon-based electrode materials. Generally, the methods include providing a mixture of the graphite particles (3) and the pentagon ring precursor in a reactor under inert gas flow; and heating the mixture for example, up to a temperature of up to 2000° C., under presence of a hydrocarbon gas. According to some aspects, the pentagon ring precursor may comprise one or more hemispheres (2) of fullerene.

According to some aspects, the hemispheres of fullerene may be prepared by opening a precursor (for example, a fullerene sphere) using thermal oxidation. According to some aspects, fullerendione (derived from pristine $C_{60}$) may be used as a precursor. For example, the precursor in media (for example, toluene, acetone, ethanol, methanol, and/or mixture thereof) may be deposited onto a substrate (for example, printed onto a ST cut quartz substrate by poly (dimethylsiloxane) (PDMS) stamp or placed onto the substrate via pipet), and then the media may be removed by evaporation in air followed by baking (for example, at 150° C.). According to some aspects, the precursor may then undergo thermal oxidation (for example, in air). For example, according to some aspects, the precursor may be heated to a temperature of about 300-500° C. for 30 minutes in a 1.8 cm tube furnace, and then heated to a temperature of about 900° C. The sample may then be treated with water to remove amorphous carbon, and then annealed (for example, at about 900° C. for 3 minutes) to remove carboxyl groups at the open end of the hemisphere, thereby activating the hemisphere.

According to some aspects, the hemispheres of fullerene may be prepared by opening a precursor wherein the precursor comprises $C_{60}$ fullerenes. For example, the hemispheres of fullerene may be prepared by dispersing $C_{60}$ fullerenes in media (for example, toluene, acetone, ethanol, methanol, and/or mixture thereof), depositing the $C_{60}$ fullerenes on a substrate (for example, an ST-cut quartz substrate), and then using pretreatment steps to open and/or functionalize (i.e., activate) the fullerenes. According to some aspects, the pretreatment steps may comprise applying an oxidation treatment (for example, heating the deposited fullerenes in air at a temperature of about 500° C. for about 75 minutes) followed by a short (for example, 2 minutes) exposure to $H_2O$ and a brief (for example, 3 minutes) exposure to $H_2$ in order to functionalize dangling bonds at the open ends of the resultant hemispheres. It will be appreciate that each method step may be optimized, for example, by optimizing the environment and/or time.

According to some aspects, hemispheres of fullerene may be prepared by partially dissolving a precursor (for example, $C_{60}$ fullerenes). For example, the fullerenes may be heated in the presence of a carbon containing gas to a temperature below that at which the fullerenes sublime (for example, between about 500° C. to 700° C. at atmospheric pressure) such that the fullerenes may partially dissolve into hemispheres. According to some aspects, the fullerenes may be dissolved in media (for example, toluene, acetone, ethanol, methanol, and/or mixture thereof) and deposited on a substrate or catalyst (for example, a metal catalyst) prior to or after heating.

To thoroughly mix the graphite particles (3) and fullerene hemispheres (2), the graphite and fullerene are placed into the reactor with one or more inert gas and mixed for a period sufficient to mix the graphite particles and fullerene hemispheres.

Example inert gases for use in the processing chamber include argon, helium, nitrogen, mixtures thereof, and any other inert gases or gas mixtures known in the art.

In one particularly suitable aspect, the mixture is heated to a temperature of from greater than 1500° C. to about 2000° C.

Example hydrocarbon gases include methane, ethylene, acetylene, ethanol, benzene, methanol, carbon-based polymer, a nano-carbon material, mixtures thereof, and/or any other gases or gas mixtures known in the art.

Using the methods described above, graphite particles and fullerene hemispheres are bound together such that the graphite particles are bridged by the fullerene hemispheres to form a composite material comprising a plurality of pores (4). Varying the ratios of graphite and fullerene hemispheres, varying the numbers of carbon rings between the graphite particles, varying the graphite aspect ratio (i.e., the ratio of a lateral dimension of the graphite to the thickness of the graphite), and/or by varying the heating temperatures used in the methods described herein, the porosity, surface area and/or crystallinity can be varied of the resulting carbon-based electrode material. According to some aspects of the present disclosure, the resulting composite material may comprise a plurality of pores (4) that are capable of reacting interstitially with ions, for example, lithium ions, thereby providing a material capable of acting as an electrode (e.g., an anode) in an electrochemical battery. For example, in the case of lithium-ion batteries, the material may comprise pores capable of taking up and releasing lithium ions (i.e., lithium ion insertion and extraction) through intercalation or a similar process. As used herein, the term "pore" refers to an opening or depression in the surface, or a tunnel, in the material, for example, between graphite particles and/or carbon rings. According to some aspects, the pore size of the plurality of pores may be varied by any of the means described herein. For example, by increasing the ratio of carbon rings to graphite, the pore size may be increased.

According to some aspects, the pores may have a pore size of from about a few nanometers up to hundreds of micrometers. For example, the pores may have a pore diameter in the range of about 0.001 to 300 nm, preferably in the range of about 0.01 to 200 nm, and more preferably in the range of about 0.1 to 150 nm. According to some aspects, the pores may have an average pore diameter of from about 0.1 to 20 nm, preferably from about 0.1 to 15 nm, and even more preferably from about 0.1 to 10 nm. According to some aspects, the pores may have an average pore diameter of from about 0.1 to 50 nm, preferably from about 10 to 40 nm, and even more preferably from about 20 to 30 nm.

According to some aspects, the pores may have a pore diameter in the range of about 0.0001 to 50 µm, preferably in the range of about 0.0001 to 10 µm, and more preferably in the range of about 0.0001 µm to 5 µm. According to some aspects, the pores may have an average pore diameter from about 0.1 to 20 µm, preferably from about 0.1 to 10 µm, more preferably from about 0.1 µm to 7 µm, and even more preferably from about 0.5 µm to 4 µm. According to some aspects, the pores may have an average pore diameter from about 0.1 to 50 nm, preferably from about 0.1 to 40 nm, more preferably from about 0.1 to 30 nm, even more preferably from about 0.1 to 20 nm, and most preferably from about 1 to 10 nm. In a non-limiting example, the average pore diameter is based on a Brunauer-Emmett-Teller (BET) measurement.

According to some aspects, the pores may have a pore volume of from about $10^{-24}$ to $10^{-6}$ liters.

According to some aspects, the volume of the pores in the material may be in the range of about 0.00001 to 0.00040 $cm^3/g$, preferably in the range of about 0.00001 to 0.00030 $cm^3/g$, and more preferably in the range of about 0.00002 to 0.00020 $cm^3/g$. According to some aspects, the average volume of the pores in the material may be from about 0.0001 to about 1.0 $cm^3/g$, preferably from about 0.0001 to 0.1 $cm^3/g$, more preferably from about 0.0001 to about 0.01 $cm^3/g$, and even more preferably from about 0.001 to about 0.01 $cm^3/g$.

According to some aspects, the material may have a specific surface area of from about less than 1 $m^2/g$ to more than 100 $m^2/g$. For example, according to some aspects, the material may have a specific surface area of from about 0.01 to 20 $m^2/g$, preferably from about 0.1 to 15 $m^2/g$, more preferably from about 1.0 to 10 $m^2/g$, and even more preferably from about 1.0 to 6.0 $m^2/g$.

According to some aspects, the material may have a density of from about 1 to 103 $kg/m^3$. According to some aspects, the pore size distribution may range from micro to meso to macro, and may be either monomodal, bimodal, or multimodal (i.e., may comprise one or more different distribution of pore sizes). According to some aspects, the material may have a pore distribution from nanometers up to millimeters. According to some aspects, the pores may have a pore length from a few nanometers up to several centimeters.

According to some aspects, the material may comprise a pore size, pore volume, surface area, density, pore size distribution, and/or pore length similar to a hard carbon material.

FIG. 4 and FIGS. 2A-2C show exemplary results of Brunauer-Emmett-Teller (BET) surface area measurements corresponding to an example porous hard carbon material according to aspects of the present disclosure. Specifically, FIG. 4 and FIGS. 2A-2D correspond to a hard carbon material that is similar to the hard carbon material disclosed in U.S. Patent Application Publication No. 2007/0287068, that is, an electrode (such as an anode) formed from a pitch-based hard carbon having an average particle size of preferably between 5 and 15 μm, a surface area of between 0.5 and 15 $m^2/g$, an interlayer spacing $d_{002}$ of between 0.355 and 0.400 nm, and a density of between 1.50 and 1.60 $g/cm^3$. The electrode of hard carbon material may be formed by mixing the hard carbon with polyvinylidene to form a paste together with N-methyl-2-pyrrolidore, which may then applied to a copper foil, dried, and then pressed to provide the electrode.

It should thus be understood that FIG. 4 and FIGS. 2A-2C show measurements that are similar to or the same as measurements corresponding to the material of the present disclosure, as the material of the present disclosure may comprise a pore size, pore volume, surface area, density, pore size distribution, and/or pore length similar to that of the hard carbon material of FIG. 4 and FIGS. 2A-2C.

Figure 3A:
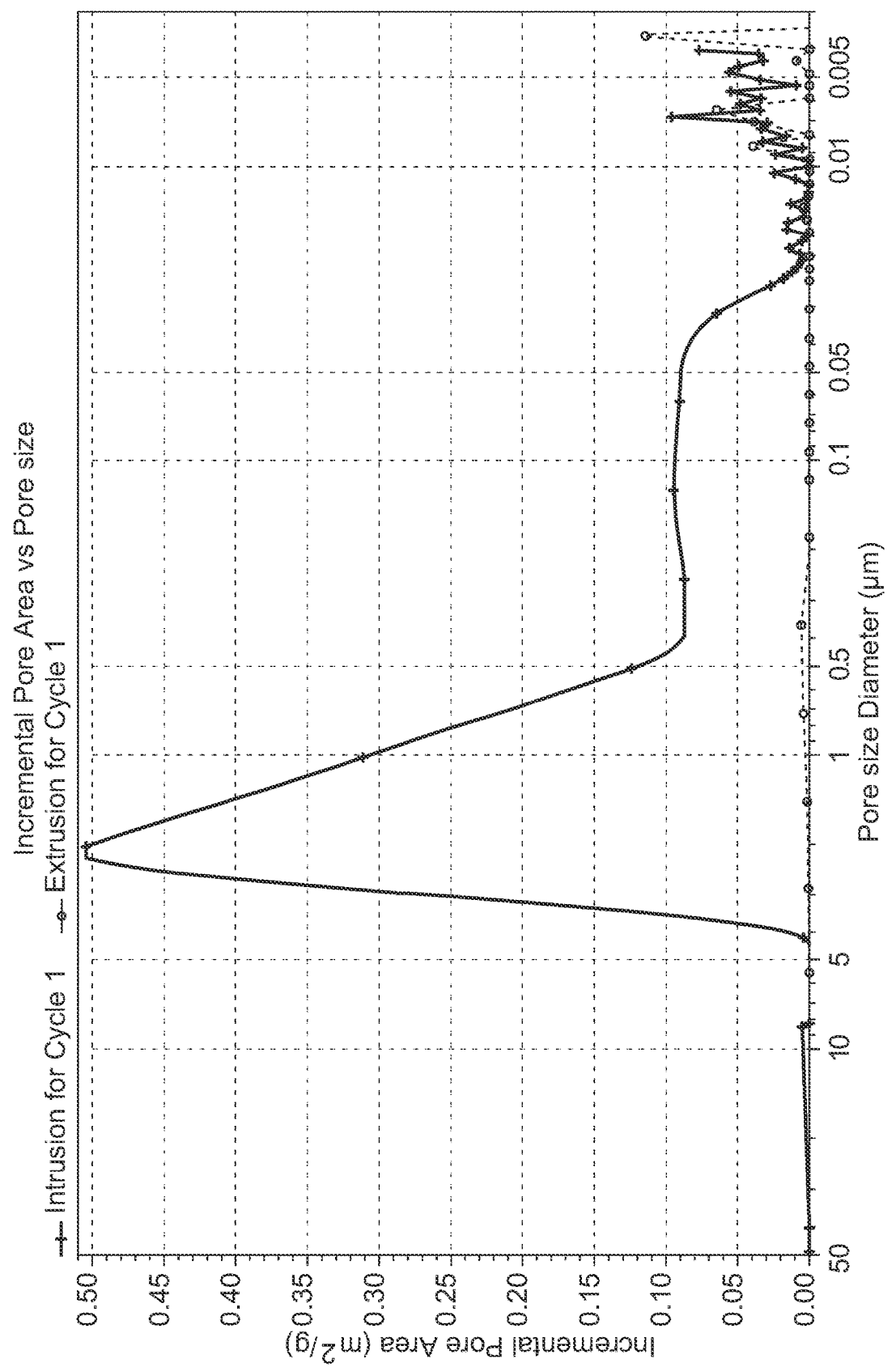
FIG. 3A shows mercury porosity measurements corresponding to an example hard carbon material according to the present disclosure.
Figure 3B:
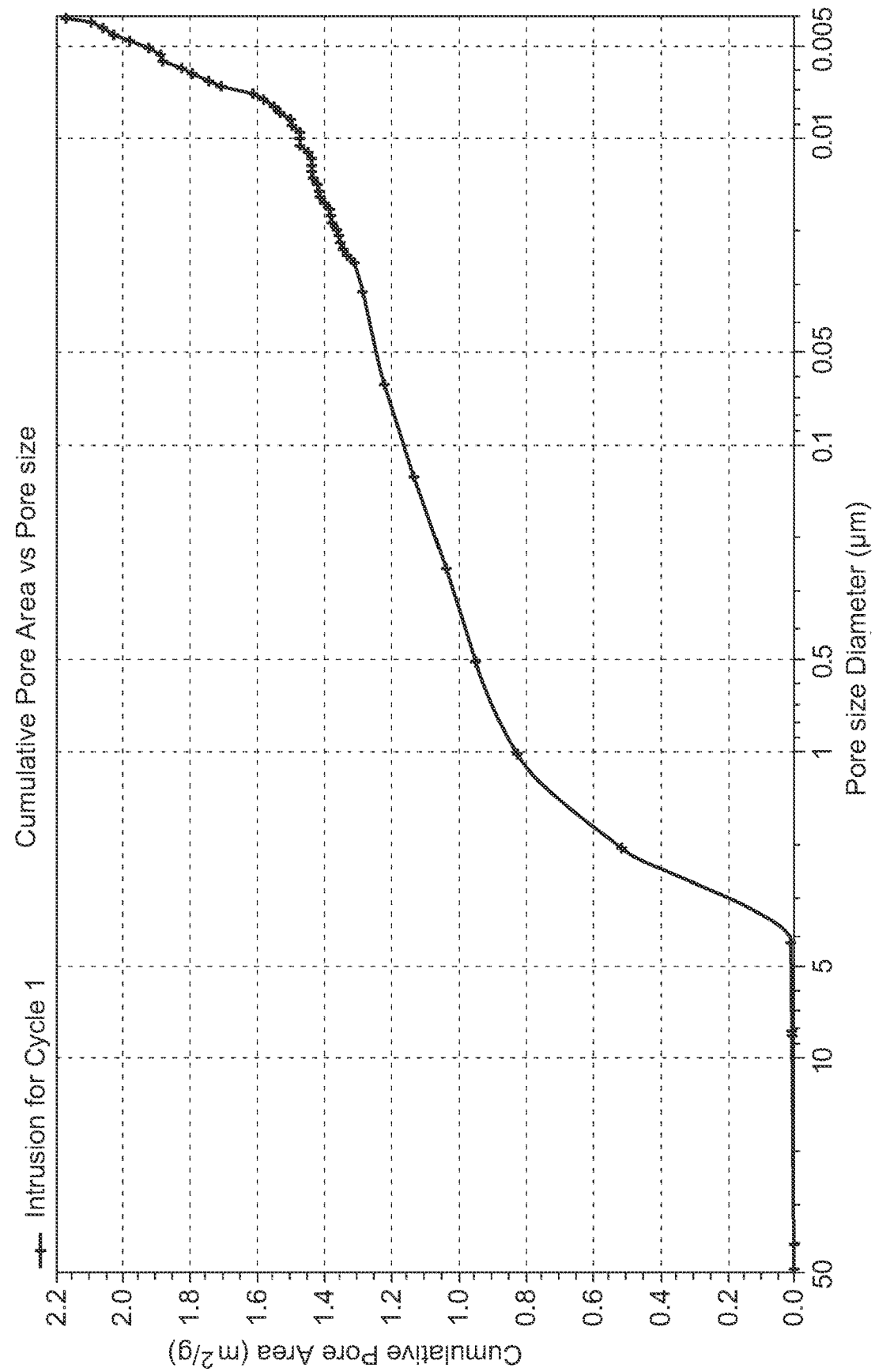
FIG. 3B shows mercury porosity measurements corresponding to an example hard carbon material according to the present disclosure.

As can be seen, for example, in FIG. 4, the adsorption average pore diameter was found to be about 6.76 nm, and the Barrett-Joyner-Halenda (BJH) adsorption average pore diameter was found to be about 27.95 nm or about 25.56 nm. FIGS. 3A and 3B show mercury porosity measurements corresponding to an example hard carbon material according to the present disclosure. As can be seen by these figures, the hard carbon material showed a pore size distribution with a peak ranging from about 0.5 to 4 μm pore diameter, with multiple peaks ranging from about 0.1 to 20 nm.

This written description uses examples to disclose the invention, including the best mode, and also to enable any person skilled in the art to practice the invention, including making and using any systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A carbon-based electrode material comprising a plurality of graphite particles and a pentagon carbon ring material, the pentagon carbon ring material comprising a plurality of discrete fullerene hemispheres,
wherein the carbon-based electrode material comprises a plurality of pores capable of reacting interstitially with lithium ions, the pores being defined by the plurality of graphite particles bridged by the pentagon carbon ring material.

2. The carbon-based electrode material as set forth in claim 1 wherein at least a portion of the plurality of graphite particles have an average particle diameter of from about 1 μm to about 45 μm.

3. The carbon-based electrode material as set forth in claim 1 wherein at least a portion of the plurality of graphite particles have a specific surface area of from about 0.1 $m^2/g$ to about 30 $m^2/g$.

4. The carbon-based electrode material as set forth in claim 1 wherein the pentagon carbon ring material further comprises fullerene, discrete, non-hemisphere fractions of fullerene, or combinations thereof.

5. The carbon-based electrode material as set forth in claim 1, wherein the plurality of pores have an average diameter of from about 0.1 to 40 nm.

6. The carbon-based electrode material as set forth in claim 5, wherein the plurality of pores have an average diameter of from about 1 to 10 nm.

7. A carbon-based electrode material comprising at least a first graphite particle connected to at least a second graphite particle, wherein the first and second graphite particles are connected by at least one discrete hemisphere of fullerene.

8. The carbon-based electrode material as set forth in claim 7 wherein at least one of the first or second graphite particles have an average particle diameter of from about 1 μm to about 45 μm.

9. The carbon-based electrode material as set forth in claim 7 wherein at least one of the first or second graphite particles have a specific surface area of from about 0.1 $m^2/g$ to about 30 $m^2/g$.

10. The carbon-based electrode material as set forth in claim 7 wherein the at least one fullerene comprises at least one of $C_{60}$ fullerene, $C_{70}$ fullerene, $C_{74}$ fullerene, $C_{78}$ fullerene, $C_{80}$ fullerene, $C_{82}$ fullerene, $C_{84}$ fullerene, $C_{88}$ fullerene, $C_{88}$ fullerene, $C_{90}$ fullerene, $C_{92}$ fullerene, $C_{94}$ fullerene, $C_{98}$ fullerene, $C_{100-250}$ fullerene, $C_{250+}$ fullerene, a dimer thereof, and a trimer thereof.

11. The carbon-based electrode material as set forth in claim 7 wherein the at least one fullerene comprises a mixture of $C_{60}$ fullerene and $C_{70}$ fullerene.

12. The carbon-based electrode material as set forth in claim 7, wherein the material comprises a plurality of pores capable of reacting interstitially with lithium ions.

13. The carbon-based electrode material as set forth in claim 12, wherein the plurality of pores have an average diameter of from about 0.1 to 40 nm.

14. The carbon-based electrode material as set forth in claim 13, wherein the plurality of pores have an average diameter of from about 1 to 10 nm.

15. A method of synthesizing a carbon-based material, the method comprising:
treating a mixture of graphite particles and discrete fullerene hemispheres to form a composite material comprising a plurality of pores defined by graphite particles bridged by the discrete hemispheres of fullerene.

16. The method as set forth in claim 15, wherein the graphite particles and hemispheres of fullerene are mixed under inert gas flow.

17. The method as set forth in claim 16, wherein the inert gas is argon.

18. The method as set forth in claim 15, wherein the treating step comprises heating the mixture to a temperature of from about 1500° C. to about 2000° C.

19. The method as set forth in claim 18, wherein the treating step further comprises heating the mixture in the presence of a hydrocarbon gas selected from the group consisting of methane and propane.

* * * * *